US 10,214,664 B2

(12) United States Patent
Lowe

(10) Patent No.: US 10,214,664 B2
(45) Date of Patent: *Feb. 26, 2019

(54) FLOOR MARKING TAPE

(71) Applicant: Clifford A. Lowe, Wake Forest, NC (US)

(72) Inventor: Clifford A. Lowe, Wake Forest, NC (US)

(*) Notice: Subject to any disclaimer, the term of this patent is extended or adjusted under 35 U.S.C. 154(b) by 18 days.

This patent is subject to a terminal disclaimer.

(21) Appl. No.: 14/747,905

(22) Filed: Jun. 23, 2015

(65) Prior Publication Data
US 2015/0291856 A1  Oct. 15, 2015

Related U.S. Application Data

(63) Continuation of application No. 14/537,490, filed on Nov. 10, 2014, which is a continuation of application
(Continued)

(51) Int. Cl.
E04F 15/00 (2006.01)
C09J 7/00 (2018.01)
(Continued)

(52) U.S. Cl.
CPC .............. C09J 7/245 (2018.01); C09J 7/20 (2018.01); C09J 2201/122 (2013.01);
(Continued)

(58) Field of Classification Search
CPC ...... C09J 7/0278; C09J 7/02; C09J 2201/122; C09J 2201/16; C09J 2201/28;
(Continued)

(56) References Cited

U.S. PATENT DOCUMENTS 2,231,780 A * 2/1941 Swenson ............... E04F 15/08
404/34
2,673,643 A * 3/1954 Blank ..................... C09J 7/02
156/302

(Continued)

FOREIGN PATENT DOCUMENTS

WO    WO 9001411 A1 * 2/1990 ......... A47G 27/0437

OTHER PUBLICATIONS

Photograph showing the profiles of two floor tapes; the left-hand tape was on sale in the United States prior to Apr. 2004; the right-hand tape is on sale in 2018.

Primary Examiner — Maria V Ewald
Assistant Examiner — Ethan Weydemeyer
(74) Attorney, Agent, or Firm — Zollinger & Burleson Ltd.

(57) ABSTRACT

A floor marking tape has a structure that retains the adhesive under the tape to prevent the adhesive from being squeezed out from under the tape when the tape is in use on a floor. In one embodiment, the structure is a shoulder that defines a recess that holds the bulk of the adhesive. The shoulder prevents the adhesive from flowing out to the outer edge of the tape. The tape may have beveled edges that limit the unintentional lifting and delamination of the tape from the floor. The upper surface of the tape may be curved from edge-to-edge to limit dirt retention on the tape as well as allowing objects to slide over the tape.

22 Claims, 1 Drawing Sheet

Related U.S. Application Data

No. 11/911,894, filed as application No. PCT/US2006/015028 on Apr. 21, 2006, now Pat. No. 8,883,290.

(60) Provisional application No. 60/673,883, filed on Apr. 22, 2005, provisional application No. 60/676,212, filed on Apr. 29, 2005.

(51) Int. Cl.
*B32B 3/02* (2006.01)
*C09J 7/24* (2018.01)
*C09J 7/20* (2018.01)

(52) U.S. Cl.
CPC ........ *C09J 2201/16* (2013.01); *C09J 2201/28* (2013.01); *C09J 2203/314* (2013.01); *C09J 2427/006* (2013.01); *E04F 15/00* (2013.01); *Y10T 428/14* (2015.01); *Y10T 428/1467* (2015.01); *Y10T 428/24488* (2015.01); *Y10T 428/24612* (2015.01); *Y10T 428/24752* (2015.01); *Y10T 428/24777* (2015.01); *Y10T 428/28* (2015.01)

(58) Field of Classification Search
CPC ........... C09J 2203/314; C09J 2427/006; E04F 15/00; Y10T 428/14; Y10T 428/1467; Y10T 428/24488; Y10T 428/24612; Y10T 428/24752; Y10T 428/24777; Y10T 428/28; G09F 3/10
USPC ... 52/3–5, 27, 33, 36.1–36.2, 103–105, 108, 52/220.1–220.8, 390–392; 428/156–157, 428/161–173, 343–355 N
See application file for complete search history.

(56) References Cited

U.S. PATENT DOCUMENTS

| | | | | |
|---|---|---|---|---|
| 3,052,917 | A | * | 9/1962 | Horn ................... B29C 47/0009 264/178 R |
| 3,923,726 | A | * | 12/1975 | Benz ....................... C08J 3/226 264/78 |
| 5,196,255 | A | | 3/1993 | Cohen |
| 5,730,446 | A | * | 3/1998 | Taylor ................. B05B 15/0456 277/312 |
| 8,883,290 | B2 | * | 11/2014 | Lowe .......................... C09J 7/02 428/157 |
| 2003/0077439 | A1 | * | 4/2003 | Neubert ................. C09J 7/0278 428/343 |
| 2009/0263610 | A1 | | 10/2009 | Yee et al. |
| 2010/0215888 | A1 | | 8/2010 | Horsman et al. |

* cited by examiner

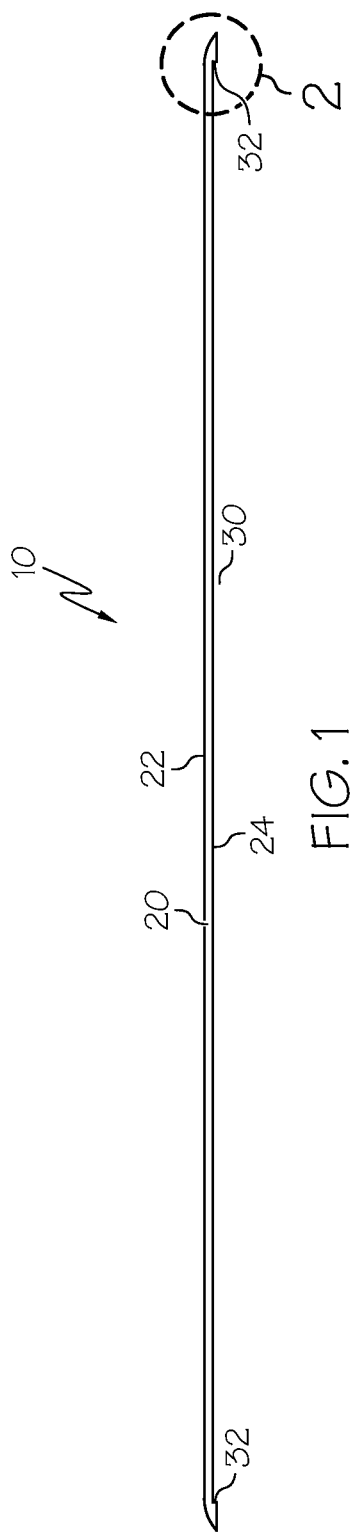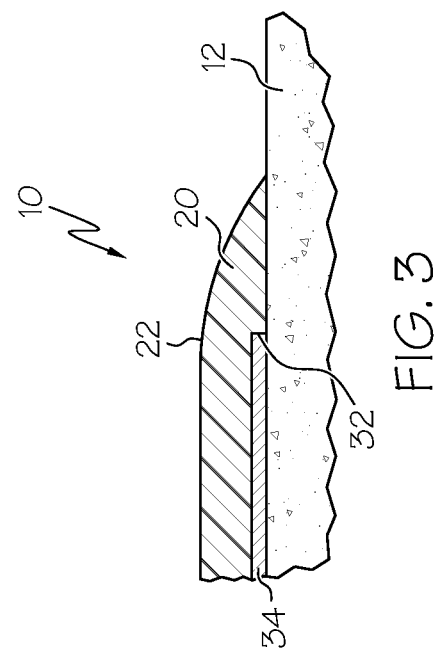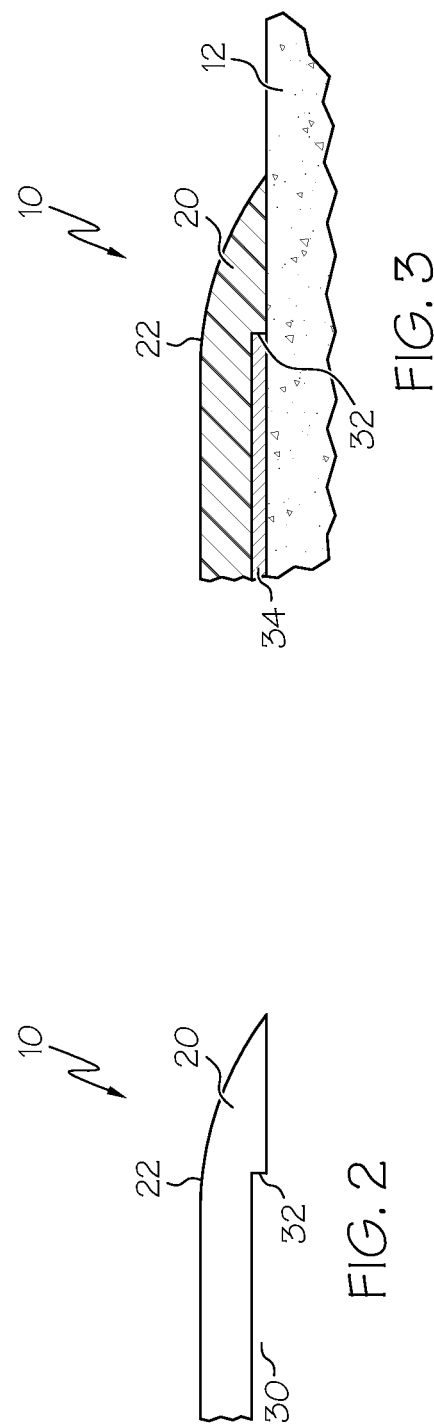

FLOOR MARKING TAPE

CROSS REFERENCE TO RELATED APPLICATIONS

This application is a continuation application claiming priority to U.S. patent application Ser. No. 14/537,490 filed Nov. 10, 2014, which is a continuation application claiming priority to U.S. patent application Ser. No. 11/911,894 filed Oct. 18, 2007, which is a U.S. National Stage Patent Application filed under 35 U.S.C. § 371 of PCT application number PCT/US2006/015028 having an international filing date of Apr. 21, 2006. This application claims the benefit of U.S. Provisional Patent Applications 60/673,883 filed Apr. 22, 2005 and 60/676,212 filed Apr. 29, 2005.

BACKGROUND OF THE INVENTION

1. Technical Field

The present invention generally relates to marking products and, more particularly, to a tape that is used to mark boundaries on a variety of substrates such as factory floors.

2. Background Information

Various boundary marking systems are known in the art. These include rails, painted lines, and tape lines. Tape lines are desirable because they can be lifted when a space is reconfigured with excessive damage to the floor. A drawback with some tape products is inconsistent coloring. Another drawback is that the edge of the tape is prone to being caught on floor cleaning devices or skids. Another drawback with existing tapes is the tendency for the adhesive used to hold the tape to the floor to be squeezed out the side of the tape where it collects dirt and helps to delaminate the tape from the floor.

BRIEF SUMMARY OF THE INVENTION

In one configuration, the invention provides a floor tape having a body having an upper surface and a lower surface; the lower surface adapted to face the floor on which the floor tape is installed; the body having a longitudinal direction; the body having a pair of lateral edges disposed in the longitudinal direction; an adhesive disposed adjacent the lower surface of the body; and the body having a structure that prevents the adhesive from reaching the lateral edges of the body when the floor tape is installed.

In another configuration, the invention provides a floor marking tape having a beveled edge to limit the unintentional lifting and delamination of the tape from the floor. The upper surface of the tape may be curved from edge-to-edge to limit dirt retention on the tape as well as allowing objects to slide over the tape.

In another configuration, the bottom surface of the tape includes a structure that retains the adhesive under the tape to prevent the adhesive from being squeezed out from under the tape. In one embodiment, the structure is a shoulder that defines a recess that holds the bulk of the adhesive. The shoulder prevents the adhesive from flowing out to the outer edge of the tape.

The invention also provides another configuration wherein the upper surface of the body of the tape is formed to have a smooth glossy surface to limit the dirt that clings to the upper surface of the tape. This surface is formed without a secondary coating.

The invention also provides a tape configuration wherein the body of the tape is rigid such that short lengths cannot be rolled for storage. These lengths are supplied pieces that are assembled on the floor end-to-end in the pattern desired by the user. The rigid body is durable and resists damage during use.

BRIEF DESCRIPTION OF THE SEVERAL VIEWS OF THE DRAWINGS

FIG. 1 is a cross section of the tape of the invention.

FIG. 2 is an enlarged view of the encircled portion of FIG. 1.

FIG. 3 is a cross section of the edge of the tape applied to a floor surface.

Similar numbers refer to similar parts throughout the specification.

DETAILED DESCRIPTION OF THE INVENTION

A tape made in accordance with the concepts of the present invention is indicated by the numeral 10 in the accompanying drawings. Tape 10 is used to mark areas of a floor 12 such as the areas around machines or aisles from forklifts. Tape 10 generally includes a body 20 having an upper surface 22 and a lower surface 24. At least the lateral edges of upper surface 22 are smoothly beveled as shown in FIG. 2. The smooth bevel helps to prevent tape 10 from being unintentionally lifted.

Lower surface 24 defines a recess 30 bounded by a pair of shoulders 32. Recess 30 may be centered with respect to body 20. Recess 30 is designed to receive the adhesive 34 that holds tape 10 to floor 12. Shoulders 32 prevent adhesive 34 from flowing out past the lateral edges of tape 10 where it collects dirt. Other structures combined with body 20 may also be used in place of or in combination with shoulders 32. Downwardly-projecting ribs and slots may be used to control adhesive flow.

In one configuration, body 20 has an overall width of 101.6 mm with recess 30 having a width of 97.8 mm leaving a shoulder width of 1.9 mm to engage floor 12 when tape 10 is installed. Recess 30 is 0.18 mm deep. The thickness of body 20 just inside shoulder 32 is 0.6 mm while body 20 has a thickness of 0.95 mm at its longitudinal centerline.

Body 20 may be fabricated from any polymer that can be calendared or extruded. Materials suitable for this application are Natural rubber, Synthetic Polyisoprene (high-cis or solution), Polybutadiene (high-cis or solution), Polybutadiene/Styrene copolymer (solution or emulsion type including SBS or SB block type polymers), Ethylene/Propylene Diene (EPDM) rubber, Butadiene/Acrylonitrile rubber, Butyl rubber (including chlorobutyl and bromobutyl types), Polyisobutylene (and copolymers), Chloroprene (Neoprene), Chlorosulfonated polymers (Hypalons), Polyepichlorohydrin, Alkylated Chlorosulfonated polymers (Ascium), Polysulfide, Polyethyene, Polypropylene, Polymethylpentene and other saturated and unsaturated polymers known in the art. Polyvinyl chloride, Polyvinylidene Choride (and Copolymers with polyvinyl chloride), Polyacrylates, Polymethacrylates (and combinations), Polyurethanes, Polyesters, Polyamides and combinations may also be used. The polymers may be thermoplastic, thermoset or cured. They may contain crosslinked polymers. Hydrogenated polymers may also be used. The preferred polymers are based on plasticized Polyvinyl chloride.

In one embodiment, body 20 is a Polyvinyl Chloride (PVC) polymer that has been formulated to be flexible, tough, tear resistant and Ultraviolet Light (UV) resistant. Body 20 may be extruded in the form shown in the drawings.

The PVC can have a wide range of molecular weights generally measured by inherent viscosity. Suitable PVC's have an inherent viscosity of between 0.53 and 1.20. The higher the inherent viscosity, the more plasticizer is needed to retain similar properties. The optimum inherent viscosity is obtained by experimentation. In one embodiment, the inherent viscosity is 110 ML/G.

The plasticizers that can be used are generally from the ester class. Suitable plasticizers are di-Octyl Adipate, di-2Ethylhexyl Adipate, di-Decyl Adipate, di-Octyl Sebacate, di-Decyl Sebacate, di-2-Ethylhexyl Sebacate, di-Octyl Phthalate, di-2-Ethylhexyl Phthalate, di-Decyl Phthalate and mixtures of the above. In one embodiment, the plasticizer is dioctyphalate, and the ratio is (weight) was 1:20.

The adhesive for this application can be one that is comprised of a number of different polymers. These adhesives are mainly non-structural type although one knowledgeable in the adhesive art may find some structural adhesives that may be suitable.

The polymers that are most widely used in the non-structural adhesives are hydrocarbon type, such as natural rubber, high cis-polyisoprene, solution polyisoprene, high cis-polybutadiene, solution polybutadiene, styrene-butadiene polymers (including di-block and triblock polymers such as the Kraton polymers produce by Shell Ltd.), butyl rubber (including chloro and bromobutyl rubber), polychloroprene (neoprene), acrylonitrile-butadiene (nitrile), and polyisobutylene. Other polymers that may be used are polysulfide, polyvinyl methyl ether, polyvinyl acetal, polyvinyl acetate, polyamide, polyester, polyolefins, acrylic and poly alkyl acrylates (such as poly hexyl acrylate, poly octyl acrylate, poly isooctyl acrylate, poly 2-ethylhexyl acrylate, poly decyl acrylate, and poly lauryl acrylate).
The last class of polymers is preferred. Combinations of compatible polymers may also be used.

In addition to the polymers other important ingredients are required such as tackifiers, fillers, antioxidants, and antiozanants.

Tackifiers used should be compatible with the rubber component used. Tackifiers that can be used are rosin and rosin derivatives, C5 to C9 hydrocarbon resins, terpenes and terpene phenolic derivatives. These may be used singly or in combination.

Fillers that can be used are carbon black, silica (fumed and precipitated), clays (hard and soft), and other mineral fillers. Other fillers such as powdered Polyvinyl Chloride (PVC) could also be used.

Antioxidant that could be used are AO 2246 (American Cyanamide), Naugard 445 (Uniroyal), and Ethyl AO 702 (Ethyl Corp.).

Antiozonants that can be used are Cyasorb UV24 (American Cyanamide) and Tinuvin 770 (Ciba Geigy).

Scrims and felts could be used as adhesive carriers.

The adhesive can be cured or uncured. Cured adhesives can be produced by Ultraviolet light, Peroxides, Sulfur/Accelerator, or by formation of Ionic Crosslinks using polyvalent cations.

The adhesive may be extruded, knife coated, calendared or by any mechanical method onto the substrate. It may also be solvent coated onto the substrate. The curing process in most cases is performed after it is applied to the substrate. Some lightly cross-linked systems can be calendared onto the substrate.

Body 20 may be extruded. A chrome-plated and/or polished extrusion die is used to provide a glossy surface finish. This glossy surface finish also helps prevent dirt and dust from collecting of the upper surface of body 20. The glossy finish may also help the visibility of the tape. An increase in glossiness may also be achieved by increasing the temperature during extrusion. Another factor that adds to the glossiness is the hardness of the surface of the material. The hardness may be above 98 on the Shore A hardness scale. In the context of this application, a glossy surface finish is desired to have a gloss test measurement (under ASTM D523 at a 60 degree angle using NOVO Gloss Meter Model 817; 21.11 degrees Celsius; 50% relative humidity) of greater than 45 and may be greater than 50. Such a glossy surface finish is comparable to a tape sold by 3M® under the trademark Vinyl Tape 471 (Yellow). Body 20 may be extruded to have a surface finish with a gloss reading falling above these limits without the requirement of a secondary coating.

Gloss tests performed by Graphic Communication Institute, Cal Poly State University, San Luis, Obispo, Calif. 93407, show that a sample of the invention extruded to have a glossy surface finish tested to have an average gloss at least 25% higher than commercially available extruded product samples sold under the trademark DURASTRIPE®. In this test, seven sample products were tested for surface glossiness. The tester measured took 10 readings (5 from two perpendicular directions) for each sample and averaged the readings.
Sample 1 3M® 471 (yellow)
Sample 2 Electro Tape Hazard Stripe #143/Yellow and Black with over-laminate (yellow tested)
Sample 3 Last Mark (yellow)
Sample 4 Superior Mark recessed adhesive/no shine (yellow)
Sample 5 Superior Mark recessed adhesive/shine (yellow) (invention embodiment)
Sample 6 DuraStripe® Original 2" (yellow)
Sample 7 DuraStripe® Original 4" (yellow)
The gloss tests results were:
Average Gloss
Sample 1 48.37
Sample 2 68.87
Sample 3 6.37
Sample 4 5.25
Sample 5 52.81
Sample 6 33.09
Sample 7 39.45

One method of manufacturing the invention is to mix the material and extrude the mixture through an extrusion die having the profile described above. The material may be extruded onto a release paper (such as wax paper). Rollers are used to control the dimensions. The material is cooled and the release paper is removed and the adhesive is applied to the recess. The adhesive may be protected by a liner until placed into use. In another embodiment, the adhesive and body material may be co-extruded.

Body 20 may be fabricated to be rigid enough so that shorter lengths (under 1500 mm) cannot be rolled for storage. These rigid body sections may be supplied to the user in a plurality of short sections that may be pieced together by the user on the floor surface. The rigid body material is durable and resists damage when in use.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described.

The invention claimed is:

1. A floor marking tape adhered to a floor wherein the floor marking tape establishes a boundary on the floor; the combination comprising:
a floor having an uppermost surface; the uppermost surface of the floor configured to support personnel and equipment thereupon;
a floor marking tape having a body that has an upper surface and a lower surface; the lower surface facing the uppermost surface of the floor to which the floor marking tape is adhered such that the body of the floor marking tape is disposed above the uppermost surface of the floor;
the body of the floor marking tape having a longitudinal direction;
the body of the floor marking tape having first and second lateral edge portions disposed in the longitudinal direction; each of the first and second lateral edge portions having an upper surface and a lower surface;
each of the first and second lateral edge portions having a width defined in a direction perpendicular to the longitudinal direction;
the upper surface of each lateral edge portion comprising an extension of the upper surface of the body;
the lower surface of each lateral edge portion being a flat coplanar extension of the lower surface of the body;
the entire body of each lateral edge portion being tapered with the upper surface of the first lateral edge portion extending to the lower surface of the first lateral edge portion and the upper surface of the second lateral edge portion extending to the lower surface of the second lateral edge portion;
each of the first and second lateral edge portions having a maximum height that is less than its width; and
an adhesive securing the lower surface of the body to the uppermost surface of the floor to establish a boundary.

2. The floor and boundary tape configuration of claim 1, wherein the body is fabricated from polyvinyl chloride.

3. The floor and boundary tape configuration of claim 1, wherein the upper surface of the body is smoothly curved between the lateral edge portions.

4. The floor and boundary tape configuration of claim 1, wherein the body has a surface finish that reads over 45 on an ASTM D523 gloss test taken at a 60 degree angle.

5. The floor and boundary tape configuration of claim 1, wherein the upper surfaces of the lateral edge portions are smoothly tapered.

6. The floor and boundary tape configuration of claim 1, wherein the body is colored evenly throughout the body.

7. The floor and boundary tape configuration of claim 1, wherein the body defines a recess; the adhesive disposed in the recess.

8. The floor and boundary tape configuration of claim 7, wherein the recess has a depth; the thickness of the adhesive being substantially the same as the depth of the recess.

9. The floor and boundary tape configuration of claim 7, wherein the body has a maximum thickness and the recess has a maximum depth; the maximum thickness of the body being at least three times larger than the maximum depth of the recess.

10. The floor and boundary tape configuration of claim 1, wherein the body has a central body portion disposed between the first and second lateral edge portions; each portion of the central body portion having a body thickness that is substantially greater than the adhesive thickness disposed directly under that portion of the central body portion.

11. A floor marking tape adhered to a floor wherein the floor marking tape establishes a boundary on the floor; the combination comprising:
a floor having an uppermost surface; the uppermost surface of the floor configured to support personnel and equipment thereupon;
a floor marking tape having a body that has an upper surface and a lower surface; the lower surface facing the uppermost surface of the floor to which the floor marking tape is adhered such that the body of the floor marking tape is disposed above the uppermost surface of the floor;
the body of the floor marking tape having a longitudinal direction;
the body of the floor marking tape having first and second lateral edge portions disposed in the longitudinal direction; each of the first and second lateral edge portions having an upper surface and a lower surface;
each of the first and second lateral edge portions having a width defined in a direction perpendicular to the longitudinal direction;
the entire body of each lateral edge portion being tapered with the upper surface of the first lateral edge portion extending to the lower surface of the first lateral edge portion to meet at a first junction and the upper surface of the second lateral edge portion extending to the lower surface of the second lateral edge portion to meet at a second junction;
the first and second junctions disposed on the uppermost surface of the floor such that the floor marking tape limits unintentional lifting of the floor marking tape from the floor;
each of the first and second lateral edge portions having a maximum height that is less than its width; and
an adhesive securing the lower surface of the body to the uppermost surface of the floor to establish a boundary.

12. The floor and boundary tape configuration of claim 11, wherein the body is fabricated from polyvinyl chloride.

13. The floor and boundary tape configuration of claim 11, wherein the upper surface of the body is smoothly curved between the lateral edge portions.

14. The floor and boundary tape configuration of claim 11, wherein the body has a surface finish that reads over 45 on an ASTM D523 gloss test taken at a 60 degree angle.

15. The floor and boundary tape configuration of claim 11, wherein the upper surfaces of the lateral edge portions are smoothly tapered.

16. The floor and boundary tape configuration of claim 11, wherein the body is colored evenly throughout the body.

17. The floor and boundary tape configuration of claim 11, wherein the body defines a recess; the adhesive disposed in the recess.

18. The floor and boundary tape configuration of claim 17, wherein the recess has a depth; the thickness of the adhesive being substantially the same as the depth of the recess.

19. The floor and boundary tape configuration of claim 17, wherein the body has a maximum thickness and the recess has a maximum depth; the maximum thickness of the body being at least three times larger than the maximum depth of the recess.

20. The floor and boundary tape configuration of claim 11, wherein the body has a central body portion disposed between the first and second lateral edge portions;
each portion of the central body portion having a body thickness that is substantially greater than the adhesive thickness disposed directly under that portion of the central body portion.

21. The floor and boundary tape configuration of claim 11, wherein the lower surface of the body of the floor marking tape that engages the adhesive is flat.

22. The floor and boundary tape configuration of claim 11, wherein the lower surface of each of the first and second lateral edge portions directly touches the uppermost surface of the floor.

\* \* \* \* \*